(12) United States Patent
Percy-Raine et al.

(10) Patent No.: US 11,963,652 B2
(45) Date of Patent: Apr. 23, 2024

(54) HANDHELD VACUUM CLEANER

(71) Applicant: Dyson Technology Limited, Wiltshire (GB)

(72) Inventors: Charles Howard Percy-Raine, Swindon (GB); Andrew John Isaacs, Gloucester (GB); Alexander Michael Campbell-Hill, Gloucester (GB); Stephen Robert Dimbylow, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 168 days.

(21) Appl. No.: 16/637,996

(22) PCT Filed: Jul. 27, 2018

(86) PCT No.: PCT/GB2018/052144
§ 371 (c)(1),
(2) Date: Feb. 10, 2020

(87) PCT Pub. No.: WO2019/034835
PCT Pub. Date: Feb. 21, 2019

(65) Prior Publication Data
US 2020/0163507 A1 May 28, 2020

(30) Foreign Application Priority Data
Aug. 11, 2017 (GB) ..................................... 1712935

(51) Int. Cl.
*A47L 9/10* (2006.01)
*A47L 5/24* (2006.01)
(Continued)

(52) U.S. Cl.
CPC ............... *A47L 9/102* (2013.01); *A47L 5/24* (2013.01); *A47L 9/122* (2013.01); *A47L 9/149* (2013.01);
(Continued)

(58) Field of Classification Search
CPC .......... A47L 9/102; A47L 9/122; A47L 9/149; A47L 9/1625; A47L 9/165; A47L 9/1675;
(Continued)

(56) References Cited

U.S. PATENT DOCUMENTS

| | | | |
|---|---|---|---|
| 1,133,543 A | 3/1915 | Duffie | |
| 1,420,665 A | 6/1922 | Newcombe | |

(Continued)

FOREIGN PATENT DOCUMENTS

| | | | |
|---|---|---|---|
| CA | 2406284 A1 | 5/2001 | |
| CN | 1278745 A | 1/2001 | |

(Continued)

OTHER PUBLICATIONS

International Search Report and Written Opinion dated Feb. 14, 2019, directed to International Application No. PCT/GB2018/052144; 13 pages.

(Continued)

*Primary Examiner* — Laura C Guidotti
*Assistant Examiner* — Caleb Andrew Holizna
(74) *Attorney, Agent, or Firm* — Tucker Ellis LLP

(57) ABSTRACT

A handheld vacuum cleaner includes a dirt separator. The dirt separator includes a chamber having an inlet through which dirt-laden fluid enters and an outlet through which cleansed fluid exits the chamber. A disc located at the outlet rotates about a rotational axis and comprises holes through which the cleansed fluid passes.

8 Claims, 8 Drawing Sheets

(51) Int. Cl.
  *A47L 9/12* (2006.01)
  *A47L 9/14* (2006.01)
  *A47L 9/16* (2006.01)
  *B01D 33/15* (2006.01)
  *B04C 5/185* (2006.01)

(52) U.S. Cl.
  CPC ............. *A47L 9/1625* (2013.01); *A47L 9/165* (2013.01); *A47L 9/1675* (2013.01); *B01D 33/155* (2013.01); *B04C 5/185* (2013.01)

(58) Field of Classification Search
  CPC ........ A47L 5/24; A47L 9/1409; A47L 9/1658; A47L 9/1666; A47L 9/1683; A47L 9/1691; A47L 9/1608; A47L 9/185; B01D 33/155; B04C 5/185
  USPC ................................... 15/347, 348, 349, 353
  See application file for complete search history.

(56) References Cited

U.S. PATENT DOCUMENTS

| | | | |
|---|---|---|---|
| 1,664,092 | A | 3/1928 | Squires |
| 2,244,165 | A * | 6/1941 | MacFarland .......... A47L 9/1675 55/DIG. 3 |
| 2,392,716 | A | 1/1946 | Acheson |
| 3,032,954 | A | 5/1962 | Racklyeft |
| 3,174,264 | A | 3/1965 | McKnab |
| 3,837,746 | A | 9/1974 | Acker et al. |
| 3,856,488 | A | 12/1974 | Kato et al. |
| 4,071,336 | A | 1/1978 | Yamine |
| 4,276,070 | A | 6/1981 | Hug |
| 4,373,941 | A | 2/1983 | Lagelbauer |
| 4,382,804 | A | 5/1983 | Mellor |
| 4,924,548 | A | 5/1990 | Touya et al. |
| 5,061,305 | A | 10/1991 | Karmel |
| 5,080,697 | A | 1/1992 | Finke |
| 5,135,552 | A | 8/1992 | Weistra |
| 5,307,538 | A | 5/1994 | Rench et al. |
| 5,428,864 | A | 7/1995 | Pemberton |
| 5,667,080 | A | 9/1997 | Klein |
| 5,914,416 | A * | 6/1999 | Thode ................... A47L 9/1675 55/467 |
| 6,192,550 | B1 | 2/2001 | Hamada et al. |
| 6,432,154 | B2 | 8/2002 | Oh et al. |
| 6,833,015 | B2 | 12/2004 | Oh et al. |
| 6,875,255 | B2 | 4/2005 | Alford et al. |
| RE38,949 | E | 1/2006 | Wright et al. |
| 7,152,276 | B2 | 12/2006 | Jin et al. |
| 7,207,083 | B2 | 4/2007 | Hayashi et al. |
| 7,210,196 | B2 | 5/2007 | Shanor et al. |
| 7,247,181 | B2 | 7/2007 | Hansen et al. |
| 7,357,823 | B1 | 4/2008 | Streciwilk |
| 7,360,275 | B2 | 4/2008 | Allgeier et al. |
| 7,377,953 | B2 | 5/2008 | Oh |
| 7,547,338 | B2 | 6/2009 | Kim et al. |
| 7,604,674 | B2 | 10/2009 | Han et al. |
| 7,678,166 | B2 | 3/2010 | Yoo et al. |
| 7,682,414 | B2 | 3/2010 | Yoshida et al. |
| 7,811,349 | B2 | 10/2010 | Nguyen |
| 8,151,407 | B2 | 4/2012 | Conrad |
| 8,225,456 | B2 | 7/2012 | Håkan et al. |
| 9,303,894 | B2 | 4/2016 | Vartiainen |
| 9,320,401 | B2 * | 4/2016 | Conrad ..................... A47L 5/32 |
| 2003/0106858 | A1 * | 6/2003 | Elsom Sharpe ....... B01D 33/56 210/787 |
| 2004/0064912 | A1 | 4/2004 | Ji et al. |
| 2004/0074043 | A1 | 4/2004 | Pullins |
| 2004/0078923 | A1 | 4/2004 | Streciwilk |
| 2004/0083573 | A1 | 5/2004 | Shanor |
| 2004/0139709 | A1 | 7/2004 | Illingworth et al. |
| 2004/0206238 | A1 | 10/2004 | Allgeier |
| 2005/0120510 | A1 | 6/2005 | Weber |
| 2005/0198771 | A1 | 9/2005 | Min et al. |
| 2007/0056255 | A1 | 3/2007 | Terauds |
| 2007/0209340 | A1 | 9/2007 | Conrad |
| 2008/0155947 | A1 | 7/2008 | Oh et al. |
| 2010/0229325 | A1 | 9/2010 | Conrad |
| 2013/0227813 | A1 | 9/2013 | Conrad |
| 2013/0269147 | A1 | 10/2013 | Conrad |
| 2013/0305483 | A1 * | 11/2013 | Dyson ................... A47L 9/1616 15/353 |
| 2014/0041344 | A1 | 2/2014 | Vartiainen |
| 2014/0237759 | A1 | 8/2014 | Conrad |
| 2015/0135474 | A1 | 5/2015 | Gidwell |
| 2015/0208886 | A1 | 7/2015 | Fischer |
| 2016/0143495 | A1 * | 5/2016 | Conrad ................... A47L 9/106 15/344 |
| 2016/0278592 | A1 | 9/2016 | Cho |
| 2017/0079490 | A1 | 3/2017 | Dimbylow |
| 2017/0079491 | A1 | 3/2017 | Dimbylow |
| 2017/0188769 | A1 | 7/2017 | Cho et al. |
| 2018/0128507 | A1 | 5/2018 | Hitzler et al. |
| 2020/0163508 | A1 | 5/2020 | Percy-Raine et al. |
| 2020/0170466 | A1 | 6/2020 | Percy-Raine et al. |
| 2020/0214516 | A1 | 7/2020 | Percy-Raine et al. |
| 2020/0214520 | A1 | 7/2020 | Percy-Raine et al. |
| 2020/0214521 | A1 | 7/2020 | Percy-Raine et al. |
| 2021/0228032 | A1 | 7/2021 | Conrad |
| 2021/0361134 | A1 | 11/2021 | Percy-Raine et al. |

FOREIGN PATENT DOCUMENTS

| | | |
|---|---|---|
| CN | 101091633 A | 12/2007 |
| CN | 101396248 A | 4/2009 |
| CN | 101626715 A | 1/2010 |
| CN | 201454275 U | 5/2010 |
| CN | 102099120 A | 6/2011 |
| CN | 104665707 A | 6/2015 |
| CN | 105030149 A | 11/2015 |
| CN | 105326441 A | 2/2016 |
| CN | 105395132 A | 3/2016 |
| CN | 105962842 A | 9/2016 |
| CN | 106049326 A | 10/2016 |
| CN | 106175580 A | 12/2016 |
| CN | 106725092 A | 5/2017 |
| CN | 106821137 A | 6/2017 |
| CN | 206374722 U | 8/2017 |
| DE | 2505125 A1 | 8/1976 |
| DE | 2856115 A1 | 7/1980 |
| DE | 9216071 U1 | 1/1993 |
| DE | 19637431 A1 | 3/1998 |
| DE | 102011081044 A1 | 2/2013 |
| DE | 102012223983 A1 | 6/2014 |
| EP | 0004145 A1 | 9/1979 |
| EP | 0053508 A1 | 6/1982 |
| EP | 2053508 A1 | 4/2009 |
| EP | 1371318 B1 | 1/2010 |
| EP | 2094142 B1 | 12/2010 |
| EP | 2275187 A2 | 1/2011 |
| EP | 2289703 A1 | 3/2011 |
| EP | 2255710 B1 | 8/2012 |
| EP | 2689703 A1 | 1/2014 |
| EP | 2308360 B1 | 6/2015 |
| EP | 3072431 A1 | 9/2016 |
| FR | 2689703 A1 | 10/1993 |
| FR | 2927523 A1 | 8/2009 |
| GB | 20345 | 1/1910 |
| GB | 190902345 A | 1/1910 |
| GB | 0229385 A | 2/1925 |
| GB | 1436403 A | 5/1976 |
| GB | 2271728 A | 4/1994 |
| GB | 2337473 A | 11/1999 |
| GB | 2372200 A | 8/2002 |
| GB | 2419833 A | 5/2006 |
| GB | 2542386 A | 3/2017 |
| JP | 50-138656 A | 11/1975 |
| JP | 54-000689 A | 1/1979 |
| JP | S54-109255 A | 8/1979 |
| JP | 57-156014 A | 9/1982 |
| JP | S60-106427 A | 6/1985 |
| JP | S60-198125 A | 10/1985 |
| JP | S61-76119 A | 4/1986 |
| JP | 61-167917 U | 10/1986 |

(56) References Cited

FOREIGN PATENT DOCUMENTS

| | | |
|---|---|---|
| JP | H11-9527 A | 1/1999 |
| JP | 2001-521811 A | 8/2000 |
| JP | 2004-201704 A | 7/2004 |
| JP | 2006-255253 A | 9/2006 |
| JP | 2006-346281 A | 12/2006 |
| JP | 2007-117713 A | 5/2007 |
| JP | 3983055 B2 | 7/2007 |
| JP | 4309905 B2 | 8/2009 |
| JP | 2010-227287 A | 10/2010 |
| JP | 2011-056402 A | 3/2011 |
| JP | 2012-61093 A | 3/2012 |
| JP | 5199731 B2 | 5/2013 |
| JP | 2014-200472 A | 10/2014 |
| JP | 2016-214329 | 12/2016 |
| JP | 2017-500094 A | 1/2017 |
| JP | 2017-042733 A | 3/2017 |
| KR | 2002-0001095 A | 1/2002 |
| KR | 10-0444551 B1 | 8/2004 |
| KR | 10-0560327 B1 | 3/2006 |
| KR | 10-2008-0076045 A | 8/2008 |
| KR | 10-1110302 B1 | 2/2012 |
| KR | 10-2015-0125223 A | 11/2015 |
| WO | 99/22844 A1 | 5/1999 |
| WO | 99/54021 A1 | 10/1999 |
| WO | 01/36103 A1 | 5/2001 |
| WO | 02/071912 A1 | 9/2002 |
| WO | 2005/011460 A1 | 2/2005 |
| WO | 2006/103610 A2 | 10/2006 |
| WO | 2015/077802 A1 | 5/2015 |
| WO | 2015/159047 A1 | 10/2015 |
| WO | 2016/163075 A1 | 10/2016 |
| WO | 2017/046557 A1 | 3/2017 |
| WO | 2017/046558 A1 | 3/2017 |
| WO | 2017/046559 A1 | 3/2017 |

OTHER PUBLICATIONS

Search Report dated Feb. 7, 2018, directed to GB Application No. 1712935.4; 1 page.
Notification of Reason for Refusal dated Feb. 22, 2021, directed to KR Application No. 10-2020-7003194; 10 pages.
The First Office Action dated Nov. 27, 2020, directed to CN Application No. 201880052111.3; 19 pages.
U.S. Office Action dated Mar. 25, 2021, directed to U.S. Appl. No. 16/637,894; 43 pages.
International Search Report and Written Opinion received for PCT Patent Application No. PCT/GB2018/052130, dated Sep. 26, 2018, 9 pages.
International Search Report and Written Opinion received for PCT Patent Application No. PCT/GB2018/052132, dated Oct. 5, 2018, 11 pages.
International Search Report and Written Opinion received for PCT Patent Application No. PCT/GB2018/052136, dated Oct. 8, 2018, 10 pages.
International Search Report and Written Opinion received for PCT Patent Application No. PCT/GB2018/052138, dated Sep. 26, 2018, 9 pages.
International Search Report and Written Opinion received for PCT Patent Application No. PCT/GB2018/052140, dated Oct. 5, 2018, 11 pages.
International Search Report and Written Opinion received for PCT Patent Application No. PCT/GB2018/052148, dated Oct. 11, 2018, 8 pages.
Notification of Reason for Refusal dated Feb. 19, 2021, directed to KR Application No. 10-2020-7002937; 10 pages.
Notification of Reason for Refusal dated Feb. 19, 2021, directed to KR Application No. 10-2020-7002938; 10 pages.
Notification of Reason for Refusal dated Feb. 19, 2021, directed to KR Application No. 10-2020-7002941; 10 pages.
Notification of Reason for Refusal dated Feb. 19, 2021, directed to KR Application No. 10-2020-7002942; 10 pages.
Notification of Reason for Refusal dated Feb. 19, 2021, directed to KR Application No. 10-2020-7003193; 10 pages.
Notification of Reason for Refusal dated Jan. 29, 2021, directed to KR Application No. 10-2020-7003200; 8 pages.
Office Action received for Chinese Patent Application No. 201880052100.5, dated Jul. 14, 2021, 19 pages (11 pages of English Translation and 8 pages of Original Document).
Office Action received for Chinese Patent Application No. 201880052103.9, dated Aug. 9, 2021, 20 pages (11 pages of English Translation and 9 pages of Original Document).
Office Action received for Chinese Patent Application No. 201880052112.8, dated Aug. 18, 2021, 14 pages (English Translation Only).
Office Action received for Japanese Application No. 2020-507618, dated May 31, 2021, 7 pages (4 pages of English Translation and 3 pages of Original Document).
Office Action received for Japanese Patent Application No. 2020-507563, dated May 31, 2021, 9 pages (5 pages of English Translation and 4 pages of Original Document).
Office Action received for Japanese Patent Application No. 2020-507592, dated May 13, 2021, 10 pages (5 pages of English Translation and 5 pages of Original Document).
Office Action received for Japanese Patent Application No. 2020-507595, dated May 31, 2021, 13 pages (7 pages of English Translation and 6 pages of Original Document).
Office Action received for Korean Patent Application No. 10-2020-7002937, dated Jun. 1, 2021, 11 pages (6 pages of English Translation and 5 pages of Original Document).
Office Action received for Korean Patent Application No. 10-2020-7002938, dated Jun. 1, 2021, 11 pages (6 pages of English Translation and 5 pages of Original Document).
Office Action received for Korean Patent Application No. 10-2020-7002942, dated Jun. 1, 2021, 10 pages (5 pages of English Translation and 5 pages of Original Document).
Office Action received for Korean Patent Application No. 10-2020-7003193, dated Jun. 1, 2021, 10 pages (5 pages of English Translation and 5 pages of Original Document).
Office Action received for Korean Patent Application No. 10-2020-7003194, dated Jun. 1, 2021, 10 pages (5 pages of English Translation and 5 pages of Original Document).
Search Report dated Jan. 18, 2018, directed to GB Application No. 1712938.8; 1 page.
Search Report dated Jan. 29, 2018, directed to GB Application No. 1712923.0; 2 pages.
Search Report dated Jan. 29, 2018, directed to GB Application No. 1712924.8; 2 pages.
Search Report dated Jan. 29, 2018, directed to GB Application No. 1712926.3; 2 pages.
Search Report dated Jan. 29, 2018, directed to GB Application No. 1712928.9; 2 pages.
Search Report dated Jan. 29, 2018, directed to GB Application No. 1712930.5; 2 pages.
The First Office Action dated Dec. 11, 2020, directed to CN Application No. 201880052103.9; 19 pages.
The First Office Action dated Dec. 2, 2020, directed to CN Application No. 201880052100.5; 21 pages.
The First Office Action dated Dec. 24, 2020, directed to CN Application No. 201880052112.8; 25 pages.
The First Office Action dated Dec. 3, 2020, directed to CN Application No. 201880052107.7; 21 pages.
The First Office Action dated Jan. 28, 2021, directed to CN Application No. 201880052153.7; 15 pages.
CN-101396248-A—English Machine Translation (Year: 2009).
Notification of Reasons for Refusal received for Japanese Application No. 2020-507684, dated Dec. 7, 2021, 5 pages (1 page of English Translation and 4 pages of Original Document).
Office Action received for Japanese Patent Application No. 2020-507592, dated May 17, 2022, 8 pages (4 pages of English Translation and 4 pages of Original Document).

(56) References Cited

OTHER PUBLICATIONS

Office Action received for Japanese Patent Application No. 2020-507684, dated Apr. 26, 2021, 10 pages (5 pages of English Translation and 5 pages of Original Document).

* cited by examiner

HANDHELD VACUUM CLEANER

CROSS-REFERENCE TO RELATED APPLICATIONS

This application is a national stage application under 35 USC 371 of International Application No. PCT/GB2018/052144, filed Jul. 27, 2018, which claims the priority of United Kingdom Application No. 1712935.4, filed Aug. 11, 2017, the entire contents of each of which are incorporated herein by reference.

FIELD OF THE DISCLOSURE

The present invention relates to a handheld vacuum cleaner.

BACKGROUND OF THE DISCLOSURE

A handheld vacuum cleaner may comprise a filter or a cyclonic separator as the primary means for removing dirt. However, both types of separator have their disadvantages. For example, the filter often has a poor separation efficiency, whilst the pressure consumed by a cyclonic separator can be high.

SUMMARY OF THE DISCLOSURE

According to various aspects, the present invention provides a handheld vacuum cleaner comprising a dirt separator, the dirt separator comprising: a chamber having an inlet through which dirt-laden fluid enters the chamber and an outlet through which cleansed fluid exits the chamber; and a disc located at the outlet, the disc being arranged to rotate about a rotational axis and comprising holes through which the cleansed fluid passes.

The dirt-laden fluid entering the chamber contacts the rotating disc, which imparts tangential forces to the fluid. As the dirt-laden fluid moves radially outward, the tangential forces imparted by the disc increase. The fluid is then drawn through the holes in the disc whilst the dirt, owing to its greater inertia, continues to move outwards and collects at the bottom of the chamber.

The handheld vacuum cleaner according to various aspects of the present invention has advantages over conventional handheld vacuum cleaners that employ filters or cyclonic separators as the primary means for removing dirt. For example, the filter typically has a poor separation efficiency and/or quickly clogs with dirt. With the handheld vacuum cleaner according to various aspects of the present invention, the holes in the disc may be sized so as to achieve a good separation efficiency, whilst rotation of the disc helps ensure that the holes in the disc are generally kept clear of dirt. The cyclonic separator of a vacuum cleaner typically comprises two or more stages of separation. The first stage often comprises a single larger cyclone chamber for removing coarse dirt, and the second stage comprises a number of smaller cyclone chambers for removing fine dirt. As a result, the overall size of the cyclonic separator can be large. A further difficulty with the cyclonic separator is that it requires high fluid speeds in order to achieve high separation efficiencies. Additionally, the fluid moving through the cyclonic separator often follows a relatively long path as it travels from the inlet to the outlet. As a result, the pressure drop associated with the cyclonic separator can be high. With the handheld vacuum cleaner according to various aspects of the present invention, relatively high separation efficiencies can be achieved in a more compact manner In particular, the dirt separator may comprise a single stage having a single chamber. Furthermore, separation occurs primarily as a result of the angular momentum imparted to the dirt by the rotating disc. As a result, relatively high separation efficiencies may be achieved at relatively low fluid speeds. Additionally, the path taken by the fluid in moving from the inlet to the outlet of the chamber is relatively short. As a result, the pressure drop across the dirt separator may be smaller than that across a cyclonic separator having the same separation efficiency.

The provision of a rotating disc within a dirt separator of a vacuum cleaner is known. However, there is an existing prejudice that the dirt separator must include a cyclone chamber to separate the dirt from the fluid. The disc is then used merely as an auxiliary filter to remove residual dirt from the fluid as it exits the cyclone chamber. As a result, the overall size of the dirt separator is relatively large and is unsuitable for use in a handheld vacuum cleaner. According to various aspects, the present invention is predicated on the realisation that effective separation may be achieved using a rotating disc without the need for cyclonic flow. As a result, a dirt separator having a size suitable for use in a handheld vacuum cleaner may be realised.

The dirt-laden fluid entering the chamber may be directed at the disc. That is to say that the dirt-laden fluid may enter the chamber via the inlet along a flow axis that intersects the disc. As noted above, although the provision of a rotating disc within a dirt separator of a vacuum cleaner is known, there is an existing prejudice that the dirt separator must include a cyclone chamber to separate the dirt from the fluid. There is a further prejudice that the rotating disc must be protected from the bulk of the dirt that enters the cyclone chamber. As a result, the dirt-laden fluid is introduced into the cyclone chamber in a manner that avoids direct collision with the disc. However, by directing the dirt-laden fluid at the disc, the dirt is subjected to relatively high tangential forces upon contact with the rotating disc. Dirt within the fluid is then thrown radially outward whilst the fluid passes axially through the holes in the disc. As a result, effective dirt separation may be achieved without the need for cyclonic flow.

The dirt-laden fluid entering the chamber may be directed at the centre of the disc. That is to say that the flow axis may intersect the centre of the disc. This then has the advantage that the flow of the dirt-laden fluid over the surface of the disc may be more evenly distributed. By contrast, if the dirt-laden fluid were directed off-centre at the disc, the fluid would most likely be unevenly distributed. The axial speed of the fluid moving through the holes may then increase at those regions of the disc that are most heavily loaded, resulting in a decrease in separation efficiency. Additionally, dirt separated from the fluid may collect unevenly within the chamber, thereby compromising the capacity of the dirt separator. Re-entrainment of dirt may also increase, leading to a further decrease in the separation efficiency. A further disadvantage of directing the dirt-laden fluid off-centre is that the disc may be subjected to uneven structural load. The resulting imbalance may lead to increased vibration and noise, and/or may reduce the lifespan of any bearings used to support the rotating disc.

Dirt separated from the dirt-laden fluid may collect at a bottom of the chamber and fill progressively in a direction towards a top of the chamber. The outlet may then be located at or adjacent the top of the chamber, and the bottom of the chamber may be spaced axially from the top of the chamber. By locating the outlet at or adjacent the top of the chamber, the disc may be kept clear of the separated dirt that collects within the chamber. As a result, effective separation may be maintained as the chamber fills with dirt. The bottom of the chamber is spaced axially (i.e. in a direction parallel the rotational axis) from the top of the chamber. This then has the benefit that dirt and fluid thrown radially outward by the disc is less likely to disturb the dirt collected at the bottom of the chamber. Additionally, any swirl within the chamber is likely to move around the chamber rather than up and down the chamber. As a result, re-entrainment of dirt collected in the chamber may be reduced, resulting in improved separation efficiency.

In contrast to an upright or canister vacuum cleaner, the orientation of a handheld vacuum cleaner often changes as the vacuum cleaner is used to clean different surfaces. For example, the vacuum cleaner may be directed downwards when cleaning floors, but upwards when cleaning ceilings. When switching between the two orientations, dirt already collected in the chamber may fall onto the disc. This may damage the disc or reduce the separation efficiency of the dirt separator. The chamber may therefore extend above and below the disc in a direction parallel to the rotational axis. Dirt separated from the dirt-laden fluid then collects in a lower portion of the chamber located below the disc when the vacuum cleaner is used in a first orientation (e.g. to clean floors), and dirt collected in the lower portion moves to an upper portion of the chamber located above the disc when the vacuum cleaner is used in a second orientation (e.g. to clean ceilings). As a result, the disc is better protected from dirt moving down the chamber when the orientation of the vacuum cleaner changes.

The inlet may be defined by an end of an inlet duct and the chamber may surround the inlet duct. That is to say that the chamber may surround the inlet duct along the full length of the inlet duct extending within the chamber. As a result, dirt is less likely to become trapped between the inlet duct and a surrounding wall of the chamber.

The inlet may defined by an end of an inlet duct that extends through a wall of the chamber, and an opposite end of the inlet duct may be attachable to different attachments of the vacuum cleaner. In particular, the inlet duct may be attachable to different accessory tools of the vacuum cleaner. By providing an inlet duct to which different attachments may be directly attached, a relatively short path may be provided between the different attachments and the dirt separator. As a result, pressure losses may be reduced.

The inlet may be defined by an end of an inlet duct that extends linearly within the chamber. This then has the advantage that the dirt-laden fluid moves through the inlet duct along a straight path and thus pressure losses may be reduced.

The inlet may be defined by an end of an inlet duct, a wall of the chamber may be moveable between an open position and a closed position, and the inlet duct may be attached to and moveable with the wall. Having a wall that moves between open and closed positions simplifies emptying of the dirt separator. Having an inlet duct that is attached to and is moveable with the wall helps encourage the removal of dirt when the wall moves to the open position. For example, when the wall moves to the open position, the moving inlet duct may push or pull dirt out of the chamber. Moreover, if the inlet duct were to remain within the chamber when the wall moves to the open position, dirt may be retained between the inlet duct and a surrounding wall of the chamber.

The disc may be formed of metal. This has at least two benefits over, say, a disc formed of plastic. First, a relatively thin disc having a relatively high stiffness may be achieved. Second, the disc is less susceptible to damage from hard or sharp objects carried by the fluid. This is of particular importance since the dirt-laden fluid entering the chamber is directed at the disc.

According to various aspects, the present invention also provides a stick vacuum cleaner comprising a handheld vacuum cleaner as described in any one of the preceding paragraphs attached to a cleaner head by an elongate tube, the elongate tube extending along an axis parallel to the rotational axis.

By having an elongate tube that extends parallel to the rotational axis, dirt-laden fluid may be carried from the cleaner head to the dirt separator and the rotating disc along a relatively straight path. As a result, pressure losses may be reduced.

The dirt separator may comprise an inlet duct that extends through a wall of the chamber, the inlet is defined by a first end of the inlet duct, and the elongate tube is attached to a second end of the inlet duct. By providing an inlet duct to which the elongate tube is directly attached, a relatively short path may be provided between the cleaner head and the dirt separator. As a result, pressure losses may be reduced.

BRIEF DESCRIPTION OF THE FIGURES

In order that the present invention may be more readily understood, embodiments of the invention will now be described, by way of example, with reference to the accompanying drawings in which.

DETAILED DESCRIPTION OF THE DISCLOSURE

Figure 1:
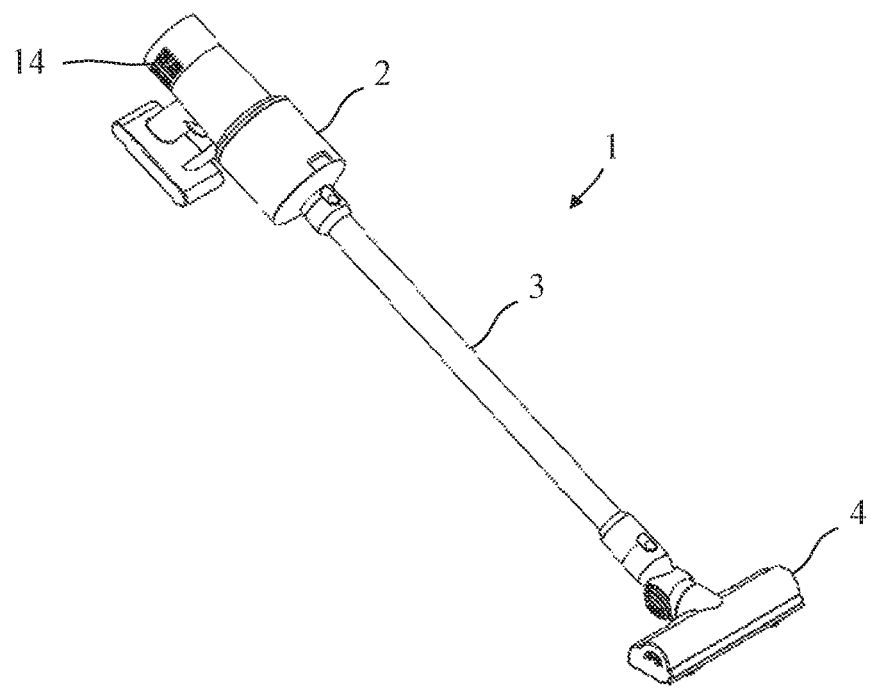
FIG. 1 is a perspective view of a vacuum cleaner.
Figure 2:
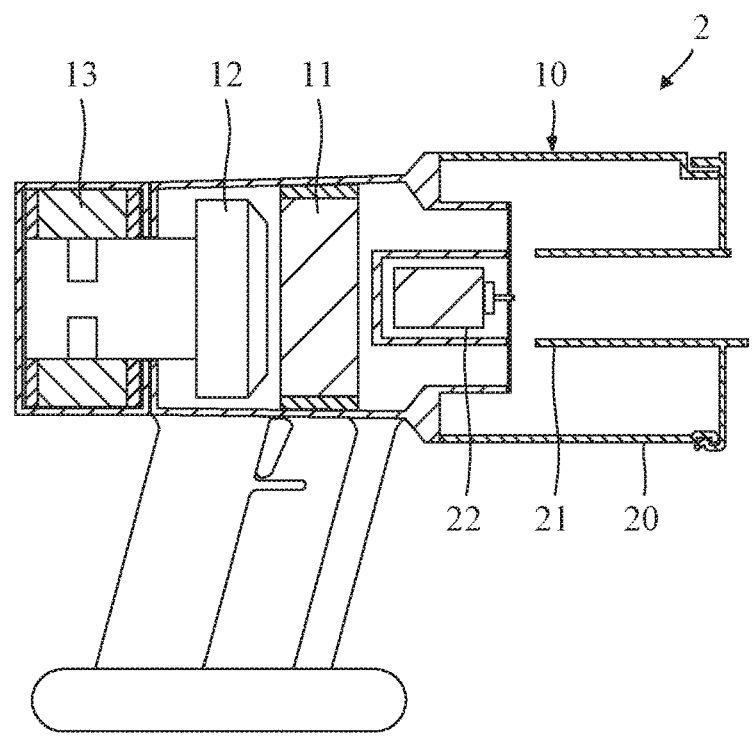
FIG. 2 is a section through a part of the vacuum cleaner.

The vacuum cleaner 1 of FIG. 1 comprises a handheld unit 2 attached to a cleaner head 4 by means of an elongate tube 3. The elongate tube 3 is detachable from the handheld unit 2 such that the handheld unit 2 may be used as a standalone vacuum cleaner.

Referring now to FIGS. 2 to 7, the handheld unit 2 comprises a dirt separator 10, a pre-motor filter 11, a vacuum motor 12 and a post-motor filter 13. The pre-motor filter 11 is located downstream of the dirt separator 10 but upstream of the vacuum motor 12, and the post-motor filter 13 is located downstream of the vacuum motor 12. During use, the vacuum motor 12 causes dirt-laden fluid to be drawn in through a suction opening in the underside of the cleaner head 4. From the cleaner head 4, the dirt-laden fluid is drawn along the elongate tube 3 and into the dirt separator 10. Dirt is then separated from the fluid and retained within the dirt separator 10. The cleansed fluid exits the dirt separator 10 and is drawn through the pre-motor filter 11, which removes residual dirt from the fluid before passing through the vacuum motor 12. Finally, the fluid expelled by the vacuum motor 12 passes through the post-motor filter 13 and is exhausted from the vacuum cleaner 1 via vents 14 in the handheld unit 2.

The dirt separator comprises a container 20, an inlet duct 21, and a disc assembly 22.

Figure 6:
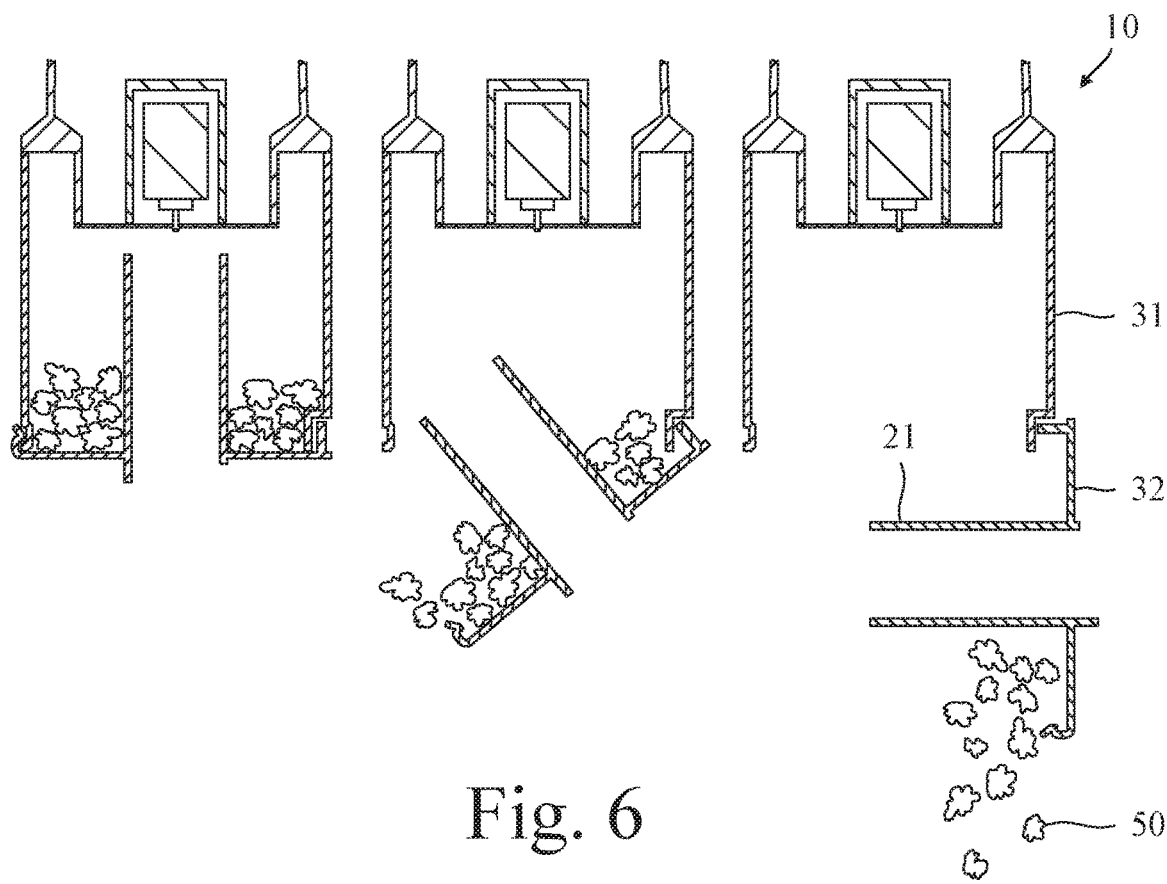
FIG. 6 illustrates emptying of the dirt separator.

The container 20 comprises a top wall 30, a side wall 31, and a bottom wall 32 that collectively define a chamber 36. An opening in the centre of the top wall defines an outlet 38 of the chamber 36. The bottom wall 32 is attached to the side wall 31 by means of a hinge 33. A catch 34 attached to the bottom wall 32 engages with a recess in the side wall 31 to hold the bottom wall 32 in a closed position. Releasing the catch 34 then causes the bottom wall 32 to swing to an open position, as illustrated in FIG. 6.

The inlet duct 21 extends upwardly through the bottom wall 32 of the container 20. The inlet duct 21 extends centrally within the chamber 36 and terminates a short distance from the disc assembly 22. One end of the inlet duct 21 defines an inlet 37 of the chamber 36. The opposite end of the inlet duct 21 is attachable to the elongate tube 3 or an accessory tool when the handheld unit 2 is used as a standalone cleaner.

The disc assembly 22 comprises a disc 40 coupled to an electric motor 41. The electric motor 41 is located outside of the chamber 36, and the disc 40 is located at and covers the outlet 38 of the chamber 36. When powered on, the electric motor 41 causes the disc 40 to rotate about a rotational axis 48. The disc 40 is formed of a metal and comprises a central non-perforated region 45 surrounded by a perforated region 46. The periphery of the disc 40 overlies the top wall 30 of the container 20. As the disc 40 rotates, the periphery of the disc 40 contacts and forms a seal with the top wall 30. In order to reduce friction between the disc 40 and the top wall 30, a ring of low-friction material (e.g. PTFE) may be provided around the top wall 30.

During use, the vacuum motor 12 causes dirt-laden fluid to be drawn into the chamber 36 via the inlet 37. The inlet duct 21 extends centrally within the chamber 36 along an axis that is coincident with the rotational axis 48 of the disc 40. As a result, the dirt-laden fluid enters the chamber 36 in an axial direction (i.e. in a direction parallel to the rotational axis 48). Moreover, the dirt-laden fluid is directed at the centre of the disc 40. The central non-perforated region of the disc 40 causes the dirt-laden fluid to turn and move radially outward (i.e. in a direction normal to the rotational axis). The rotating disc 40 imparts tangential forces to the dirt-laden fluid, causing the fluid to swirl. As the dirt-laden fluid moves radially outward, the tangential forces imparted by the disc 40 increase. Upon reaching the perforated region 46 of the disc 40, the fluid is drawn axially through the holes 47 in the disc 40. This requires a further turn in the direction of the fluid. The inertia of the larger and heavier dirt is too great to allow the dirt to follow the fluid. As a result, rather than being drawn through the holes 47, the dirt continues to move radially outwards and eventually collects at the bottom of the chamber 36. Smaller and lighter dirt may follow the fluid through the disc 40. The bulk of this dirt is then subsequently removed by the pre-motor and post-motor filters 11, 13. In order to empty the dirt separator 10, the catch 34 is released and the bottom wall 32 of the container 20 swings open. As illustrated in FIG. 6, the container 20 and the inlet duct 21 are configured such that the inlet duct 21 does not prevent or otherwise hinder the movement of the bottom wall 32.

Figure 7:
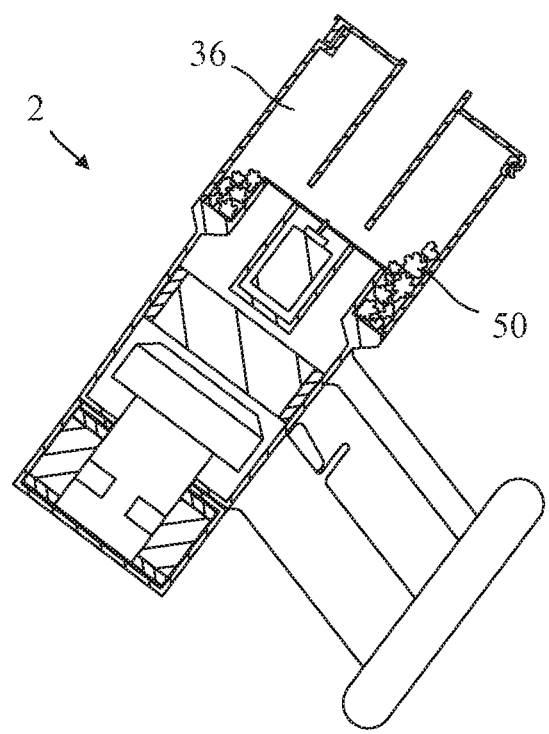
FIG. 7 is a section through a part of the vacuum cleaner when used for above-floor cleaning.

In addition to cleaning floor surfaces, the vacuum cleaner 1 may be used to clean above-floor surfaces such as shelves, curtains or ceilings. When cleaning these surfaces, the handheld unit 2 may be inverted as shown in FIG. 7. Dirt 50 collected in the chamber 36 may then fall down towards the disc 40. Any dirt falling onto the disc 40 is likely to be drawn through or block some of the holes 47 in the perforated region 46. As a result, the available open area of the disc 40 will decrease and the speed of the fluid moving axially through the disc 40 will increase. More dirt is then likely to be carried by the fluid through the disc 40 and thus the separation efficiency of the dirt separator 10 is likely to decrease. The top wall 30 of the container 20 is not flat but is instead stepped. As a result, the chamber 36 comprises a gulley located between the side wall 31 and the step in the top wall 30. This gulley surrounds the disc 40 and acts to collect dirt 50 that falls down the chamber 36. As a result, less dirt is likely to fall onto the disc 40 when the handheld unit 2 is inverted.

The dirt separator 10 has several advantages over a conventional separator that employs a porous bag. The pores of a bag quickly clog with dirt during use. This then reduces the suction that is achieved at the cleaner head. Additionally, the bag must normally be replaced when full, and it is not always easy to determine when the bag is full. With the dirt separator described herein, rotation of the disc 40 ensures that the holes 47 in the perforated region 46 are generally kept clear of dirt. As a result, no significant reduction in suction is observed during use. Additionally, the dirt separator 10 may be emptied by opening the bottom wall 32 of the container 20, thus avoiding the need for replacement bags. Furthermore, by employing a transparent material for the side wall 31 of the container 20, a user is able to determine with relative ease when the dirt separator 10 is full and requires emptying. The aforementioned disadvantages of a porous bag are well known and are solved equally well by a separator that employs cyclonic separation. However, the dirt separator 10 described herein also has advantages over a cyclonic separator.

In order to achieve a relatively high separation efficiency, the cyclonic separator of a vacuum cleaner typically comprises two or more stages of separation. The first stage often comprises a single, relatively large cyclone chamber for removing coarse dirt, and the second stage comprises a number of relatively small cyclone chambers for removing fine dirt. As a result, the overall size of the cyclonic separator can be relatively large. A further difficulty with the cyclonic separator is that it requires high fluid speeds in order to achieve high separation efficiencies. Furthermore, the fluid moving through the cyclonic separator often follows a relatively long path as it travels from the inlet to the outlet. The long path and high speeds result in high aerodynamic losses. As a result, the pressure drop associated with the cyclonic separator can be high. With the dirt separator described herein, relatively high separation efficiencies can be achieved in a more compact manner In particular, the dirt separator comprises a single stage having a single chamber. Furthermore, separation occurs primarily as a result of the angular momentum imparted to the dirt-laden fluid by the rotating disc 40. As a result, relatively high separation efficiencies can be achieved at relatively low fluid speeds. Additionally, the path taken by the fluid in moving from the inlet 37 to the outlet 38 of the dirt separator 10 is comparatively short. As a consequence of the lower fluid speeds and shorter path, aerodynamic losses are smaller. As a result, the pressure drop across the dirt separator 10 is smaller than that across the cyclonic separator, for the same separation efficiency. The vacuum cleaner 1 is therefore able to achieve the same cleaning performance as that of a cyclonic vacuum cleaner using a less powerful vacuum motor. This is particularly important should the vacuum cleaner 1 be powered by a battery, since any reduction in the power consumption of the vacuum motor 11 may be used to increase the runtime of the vacuum cleaner 1.

The provision of a rotating disc within a dirt separator of a vacuum cleaner is known. For example, DE19637431 and U.S. Pat. No. 4,382,804 each describe a dirt separator having a rotating disc. However, there is an existing prejudice that the dirt separator must include a cyclone chamber to separate the dirt from the fluid. The disc is then used merely as an auxiliary filter to remove residual dirt from the fluid as it exits the cyclone chamber. There is a further prejudice that the rotating disc must be protected from the bulk of the dirt that enters the cyclone chamber. The dirt-laden fluid is therefore introduced into the cyclone chamber in a manner that avoids direct collision with the disc.

The dirt separator described herein exploits the finding that dirt separation may be achieved with a rotating disc without the need for a cyclone chamber. The dirt separator further exploits the finding that effective dirt separation may be achieved by introducing the dirt-laden fluid into a chamber in a direction directly towards the disc. By directing the dirt-laden fluid at the disc, the dirt is subjected to relatively high forces upon contact with the rotating disc. Dirt within the fluid is then thrown radially outward whilst the fluid passes axially through the holes in the disc. As a result, effective dirt separation is achieved without the need for cyclonic flow.

The separation efficiency of the dirt separator 10 and the pressure drop across the dirt separator 10 are sensitive to the size of the holes 47 in the disc 40. For a given total open area, the separation efficiency of the dirt separator 10 increases as the hole size decreases. However, the pressure drop across the dirt separator 10 also increases as the hole size decreases. The separation efficiency and the pressure drop are also sensitive to the total open area of the disc 40. In particular, as the total open area increases, the axial speed of the fluid moving through the disc 40 decreases. As a result, the separation efficiency increases and the pressure drop decreases. It is therefore advantageous to have a large total open area. However, increasing the total open area of the disc 40 is not without its difficulties. For example, as already noted, increasing the size of the holes in order to increase the total open area may actually decrease the separation efficiency. As an alternative, the total open area may be increased by increasing the size of the perforated region 46. This may be achieved by increasing the size of the disc 40 or by decreasing the size of the non-perforated region 45. However, each of these options has its disadvantages. For example, since a contact seal is formed between the periphery of the disc 40 and the top wall 30, more power will be required to drive a disc 40 having a larger diameter. Additionally, a rotating disc 40 of larger diameter may generate more stirring within the chamber 36. As a result, re-entrainment of dirt already collected in the chamber 36 may increase and thus there may actually be a net decrease in the separation efficiency. On the other hand, if the diameter of the non-perforated region 45 were decreased then, for reasons detailed below, the axial speed of the fluid moving through the disc 40 may actually increase. Another way of increasing the total open area of the disc 40 is to decrease the land between the holes 47. However, decreasing the land has its own difficulties. For example, the stiffness of the disc 40 is likely to decrease and the perforated region 46 is likely to become more fragile and thus more susceptible to damage. Additionally, decreasing the land between holes may introduce manufacturing difficulties. There are therefore many factors to consider in the design of the disc 40.

The disc 40 comprises a central non-perforated region 45 surrounded by a perforated region 46. The provision of a central non-perforated region 45 has several advantages, which will now be described.

The stiffness of the disc 40 may be important in achieving an effective contact seal between the disc 40 and the top wall 30 of the container 20. Having a central region 45 that is non-perforated increases the stiffness of the disc 40. As a result, a thinner disc may be employed. This then has the benefit that the disc 40 may be manufactured in a more timely and cost-effective manner Moreover, for certain methods of manufacture (e.g. chemical etching), the thickness of the disc 40 may define the minimum possible dimensions for the holes 47 and land. A thinner disc therefore has the benefit that such methods may be used to manufacture a disc having relatively small hole and/or land dimensions. Furthermore, the cost and/or weight of the disc 40, along with the mechanical power required to drive the disc 40, may be reduced. Consequently, a less powerful, and potentially smaller and cheaper motor 41 may be used to drive the disc 40.

By having a central non-perforated region 45, the dirt-laden fluid entering the chamber 36 is forced to turn from an axial direction to a radial direction. The dirt-laden fluid then moves outward over the surface of the disc 40. This then has at least two benefits. First, as the dirt-laden fluid moves over the perforated region 46, the fluid is required to turn through a relatively large angle (around 90 degrees) in order to pass through the holes 47 in the disc 40. As a result, less of the dirt carried by the fluid is able to match the turn and pass through the holes 47. Second, as the dirt-laden fluid moves outward over the surface of the disc 40, the dirt-laden fluid helps to scrub the perforated region 46. Consequently, any dirt that may have become trapped at a hole 47 is swept clear by the fluid.

The tangential speed of the disc 40 decreases from the perimeter to the centre of the disc 40. As a result, the tangential forces imparted to the dirt-laden fluid by the disc 40 decrease from the perimeter to the centre. If the central region 45 of the disc 40 were perforated, more dirt is likely to pass through the disc 40. By having a central non-perforated region 45, the holes 47 are provided at regions of the disc 40 where the tangential speeds and thus the tangential forces imparted to the dirt are relatively high.

As the dirt-laden fluid introduced into the chamber 36 turns from axial to radial, relatively heavy dirt may continue to travel in an axial direction and impact the disc 40. If the central region 45 of the disc 40 were perforated, relatively hard objects impacting the disc 40 may puncture or otherwise damage the land between the holes 47. By having a central region 45 that is non-perforated, the risk of damaging the disc 40 is reduced.

The diameter of the non-perforated region 45 is greater than the diameter of the inlet 37. As a result, hard objects carried by the fluid are less likely to impact the perforated region 46 and damage the disc 40. Additionally, the dirt-laden fluid is better encouraged to turn from an axial direction to a radial direction on entering the chamber 36. The separation distance between the inlet 37 and the disc 40 plays an important part in achieving both these benefits. As the separation distance between the inlet 37 and the disc 40 increases, the radial component of the velocity of the dirt-laden fluid at the perforated region 46 of the disc 40 is likely to decrease. As a result, more dirt is likely to be carried through the holes 47 in the disc 40. Additionally, as the separation distance increases, hard objects carried by the fluid are more likely to impact the perforated region 46 and damage the disc 40. A relatively small separation distance is therefore desirable. However, if the separation distance is too small, dirt larger than the separation distance will be unable to pass between the inlet duct 21 and the disc 40 and will therefore become trapped. The size of the dirt carried by the fluid will be limited by, among other things, the diameter of the inlet duct 21. In particular, the size of the dirt is unlikely to be greater than the diameter of the inlet duct 21. Accordingly, by employing a separation distance that is no greater than the diameter of the inlet 37, the aforementioned benefits may be achieved whilst providing sufficient space for dirt to pass between the inlet duct 21 and the disc 40.

Irrespective of the separation distance that is chosen, the non-perforated region 45 of the disc 40 continues to provide advantages. In particular, the non-perforated region 45 ensures that the holes 47 in the disc 40 are provided at regions where tangential forces imparted to the dirt by the disc 40 are relatively high. Additionally, although the dirt-laden fluid follows a more divergent path as the separation distance increases, relatively heavy objects are still likely to continue along a relatively straight path upon entering the chamber 36. A central non-perforated region 45 therefore continues to protect the disc 40 from potential damage.

In spite of the advantages, the diameter of the non-perforated region 45 need not be greater than the diameter of the inlet 37. By decreasing the size of the non-perforated region 45, the size of the perforated region 46 and thus the total open area of the disc 46 may be increased. As a result, the pressure drop across the dirt separator 10 is likely to decrease. Additionally, a decrease in the axial speed of the dirt-laden fluid moving through the perforated region 46 may be observed. However, as the size of the non-perforated region 45 decreases, there will come a point at which the fluid entering the chamber 36 is no longer forced to turn from axial to radial before encountering the perforated region 46. There will therefore come a point at which the decrease in axial speed due to the larger open area is offset by the increase in axial speed due to the smaller turn angle.

Conceivably, the central region 45 of the disc 40 may be perforated. Although many of the advantages described above would then be forfeited, there may nevertheless be advantages in having a disc 40 that is fully perforated. For example, it may be simpler and/or cheaper to manufacture the disc 40. In particular, the disc 40 may be cut from a continuously perforated sheet. Even if the central region 45 were perforated, the disc 40 would continue to impart tangential forces to the dirt-laden fluid entering the chamber 36, albeit smaller forces at the centre of the disc 40. The disc 40 would therefore continue to separate dirt from the fluid, albeit at a reduced separation efficiency. Additionally, if the central region 45 of the disc 40 were perforated, dirt may block the holes at the very centre of the disc 40 owing to the relatively low tangential forces imparted by the disc 40. With the holes at the very centre blocked, the disc 40 would then behave as if the centre of the disc 40 were non-perforated. Alternatively, the central region 45 may be perforated but have an open area that is less than that of the surrounding perforated region 46. Moreover, the open area of the central region 45 may increase as one moves radially outward from the centre of the disc 40. This then has the benefit that the open area of the central region 45 increases as the tangential speed of the disc 40 increases.

Figure 8:
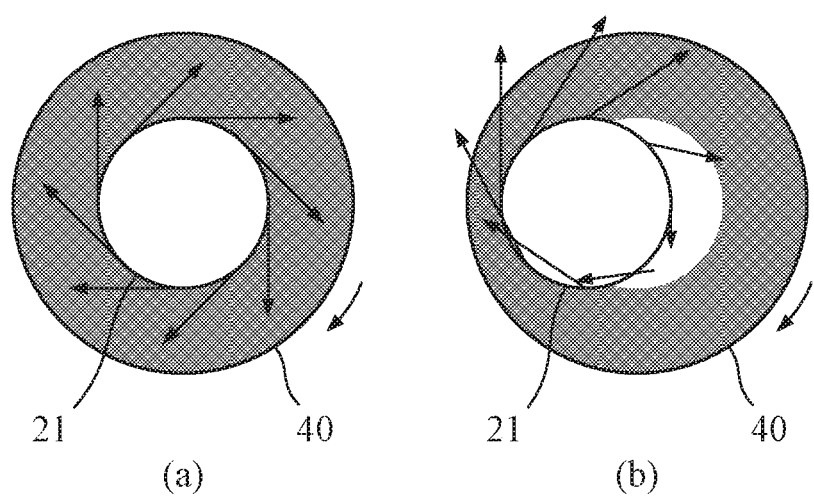
FIG. 8 illustrates the tangential forces imparted by the disc to the dirt-laden fluid at the circumference of an inlet duct that is (a) directed at the centre of the disc and (b) is directed off-centre.

The inlet duct 21 extends along an axis that is coincident with the rotational axis 48 of the disc 40. As a result, the dirt-laden fluid entering the chamber 36 is directed at the centre of the disc 40. This then has the advantage that the dirt-laden fluid is distributed evenly over the surface of the disc 40. By contrast, if the inlet duct 21 were directed off-centre at the disc 40, the fluid would be unevenly distributed. In order to illustrate this point, FIG. 8 shows the tangential forces imparted to the dirt-laden fluid by the disc at the circumference of an inlet duct 21 that is (a) directed at the centre of the disc 40 and (b) is directed off-centre. It can be seen that, when the inlet duct 21 is directed off-centre, the dirt-laden fluid does not flow evenly over the surface of the disc 40. In the example shown in FIG. 8(b), the lower half of the disc 40 sees very little of the dirt-laden fluid. This uneven distribution of fluid over the disc 40 is likely to have one or more adverse effects. For example, the axial speed of the fluid through the disc 40 is likely to increase at those regions that are most heavily exposed to the dirt-laden fluid. As a result, the separation efficiency of the dirt separator 10 is likely to decrease. Additionally, dirt separated by the disc 40 may collect unevenly within the container 20. As a result, the capacity of the dirt separator 10 may be compromised. Re-entrainment of dirt 50 already collected within the container 20 may also increase, leading to a further decrease in the separation efficiency. A further disadvantage of directing the dirt-laden fluid off-centre is that the disc 40 is subjected to uneven structural load. The resulting imbalance may lead to a poor seal with the top wall 30 of the container 20, and may reduce the lifespan of any bearings used to support the disc assembly 22 within the vacuum cleaner 1.

The inlet duct 21 is attached to and may be formed integrally with the bottom wall 32. The inlet duct 21 is therefore supported within the chamber by the bottom wall 32. The inlet duct 21 may alternatively be supported by the side wall 31 of the container 20, e.g. using one or more braces that extend radially between the inlet duct 21 and the side wall 31. This arrangement has the advantage that the bottom wall 32 is free to open and close without movement of the inlet duct 21. As a result, a taller container 20 having a larger dirt capacity may be employed. However, a disadvantage with this arrangement is that the braces used to support the inlet duct 21 are likely to inhibit dirt falling from the chamber 36 when the bottom wall 32 is opened, thus making emptying of the container 20 more difficult.

The inlet duct 21 extends linearly within the chamber 36. This then has the advantage that the dirt-laden fluid moves through the inlet duct 21 along a straight path. However, this arrangement is not without its difficulties. The bottom wall 32 is arranged to open and close and is attached to the side wall 31 by means of a hinge 33 and catch 34. Accordingly, when a user applies a force to the handheld unit 2 in order to manoeuvre the cleaner head 4 (e.g. a push or pull force in order to manoeuvre the cleaner head 4 forwards and backwards, a twisting force in order to steer the cleaner head 4 left or right, or a lifting force in order to lift the cleaner head 4 off the floor), the force is transferred to the cleaner head 4 via the hinge 33 and catch 34. The hinge 33 and catch 34 must therefore be designed in order to withstand the required forces. As an alternative arrangement, the bottom wall 32 may be fixed to the side wall 31, and the side wall 31 may be removably attached to the top wall 30. The container 20 is then emptied by removing the side and bottom walls 31, 32 from the top wall 30 and inverting. Although this arrangement has the advantage that it is not necessary to design a hinge and catch capable of withstanding the required forces, the dirt separator 10 is less convenient to empty.

Figure 9:
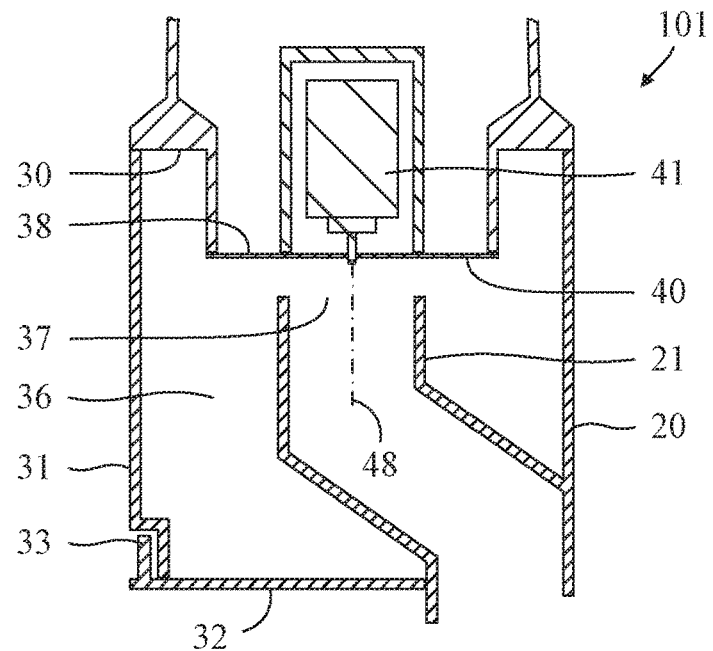
FIG. 9 is a section through a first alternative dirt separator.

An alternative dirt separator 101 is illustrated in FIG. 9. Part of the inlet duct 21 extends along and is attached to or is formed integrally with the side wall 31 of the container 20. The bottom wall 32 is again attached to the side wall 31 by a hinge 33 and catch (not shown). However, the inlet duct 21 no longer extends through the bottom wall 32. Accordingly, when the bottom wall 32 moves between the closed and opened positions, the position of the inlet duct 21 is unchanged. This then has the advantage that the container 20 is convenient to empty without the need to design a hinge and catch capable of withstanding the required forces. However, as is evident from FIG. 9, the inlet duct 21 is no longer straight. As a result, there will be increased losses due to the bends in the inlet duct 21 and thus the pressure drop associated with the dirt separator 10 is likely to increase. Although the inlet duct 21 of the arrangement shown in FIG. 9 is no longer straight, the end portion of the inlet duct 21 continues to extend along an axis that is coincident with the rotational axis 48 of the disc 40. As a result, the dirt-laden fluid continues to enter the chamber 36 in an axial direction that is directed at the centre of the disc 40.

Figure 10:
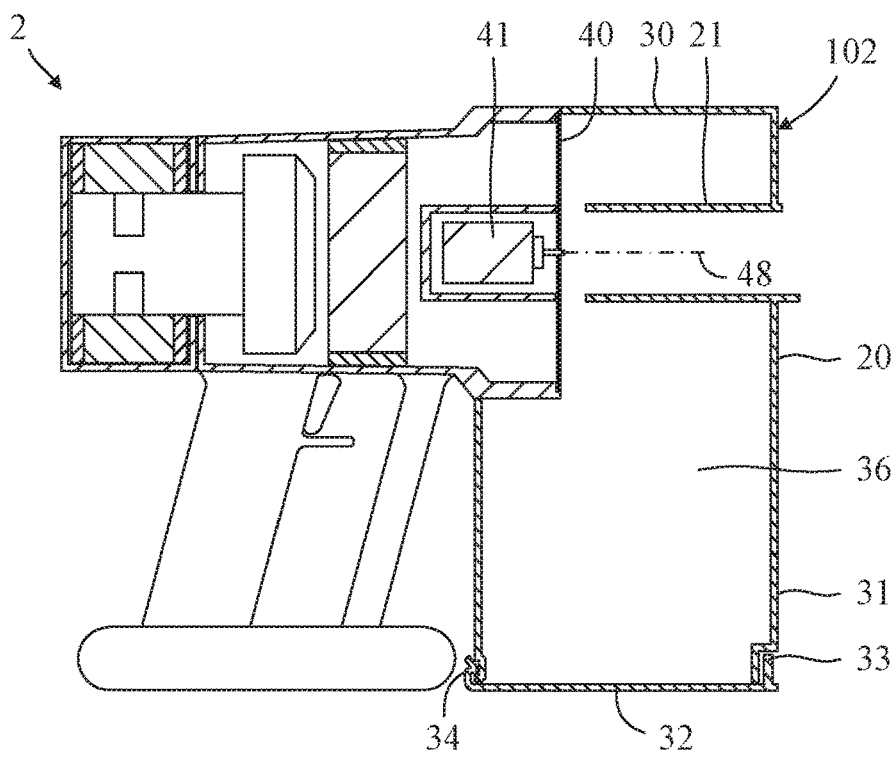
FIG. 10 is a section through a part of a vacuum cleaner having a second alternative dirt separator.

FIG. 10 illustrates a further dirt separator 102 in which the inlet duct 21 extends linearly through the side wall 31 of the container 20. The bottom wall 32 is then attached to the side wall 31 by means of a hinge 33 and is held closed by a catch 34. In the arrangements illustrated in FIGS. 3 and 9, the chamber 36 of the dirt separator 10, 101 is essentially cylindrical in shape, with the longitudinal axis of the chamber 36 coincident with the rotational axis 48 of the disc. The disc 40 is then located towards the top of the chamber 36, and the inlet duct 21 extends upwardly from the bottom of the chamber 36. Reference to top and bottom should be understood to mean that dirt separated from the fluid collects preferentially at the bottom of the chamber 36, and fills progressively in a direction towards the top of the chamber 36. With the arrangement shown in FIG. 10, the shape of the chamber 36 may be thought of as the union of a cylindrical top portion and a cubical bottom portion. Both the disc 40 and the inlet duct 21 are then located towards the top of the chamber 36. Since the inlet duct 21 extends through the side wall 31 of the container 20, this arrangement has the advantage that the container 20 may be conveniently emptied via the bottom wall 32 without the need for a hinge and catch capable of withstanding the forces required to manoeuvre the cleaner head 4. Additionally, since the inlet duct 21 is linear, pressure losses associated with the inlet duct 21 are reduced. The arrangement has at least three further advantages. First, the dirt capacity of the dirt separator 102 is significantly increased. Second, when the handheld unit 2 is inverted for above-floor cleaning, dirt within the container 20 is less likely to fall onto the disc 40. There is therefore no need for the chamber 36 to include a protective gulley around the disc 40, and thus a larger disc 40 having a larger total open area may be used. Third, the bottom wall 32 of the container 20 may be used to support the handheld unit 2 when resting on a level surface. This arrangement is not, however, without its disadvantages. For example, the larger container 20 may obstruct access to narrow spaces, such as between items of furniture or appliances. Additionally, the bottom of the chamber 36 is spaced radially from the top of the chamber 36. That is to say that the bottom of the chamber 36 is spaced from the top of the chamber 36 in a direction normal to the rotational axis 48 of the disc 40. As a result, dirt and fluid thrown radially outward by the disc 40 may disturb the dirt collected in the bottom of the chamber 36. Additionally, any swirl within the chamber 36 will tend to move up and down the chamber 36. Consequently, re-entrainment of dirt may increase, resulting in a decrease in separation efficiency. By contrast, in the arrangements illustrated in FIGS. 3 and 9, the bottom of the chamber 36 is spaced axially from the top of the chamber 36. Dirt and fluid thrown radially outward by the disc 40 is therefore less likely to disturb the dirt collected in the bottom of the chamber 36. Additionally, any swirl within the chamber 36 moves around the chamber 36 rather than up and down the chamber 36.

Figure 3:
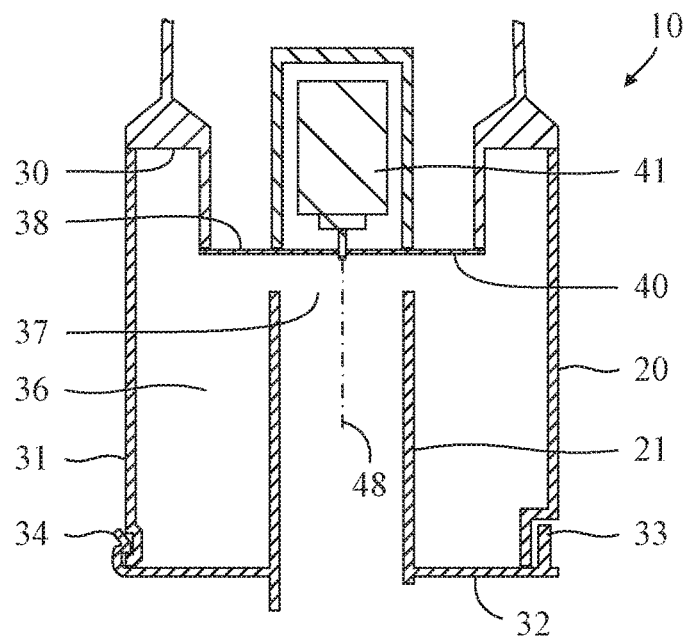
FIG. 3 is a section through a dirt separator of the vacuum cleaner.
Figure 4:
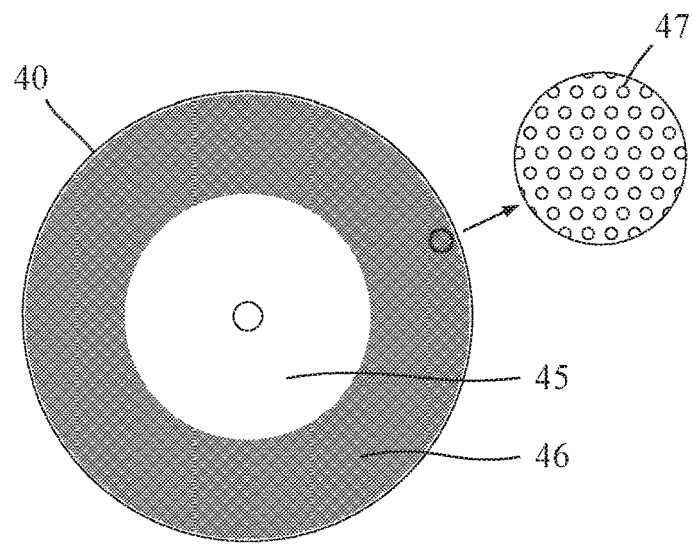
FIG. 4 is a plan view of a disc of the dirt separator.
Figure 5:
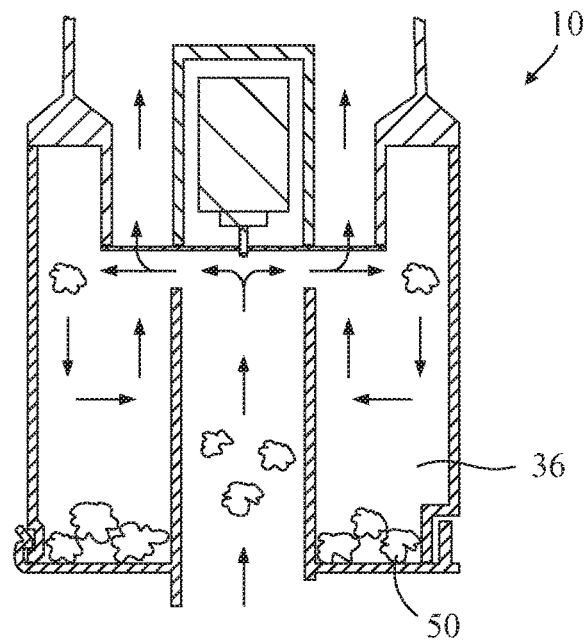
FIG. 5 illustrates the flow of dirt-laden fluid through the dirt separator.
Figure 11:
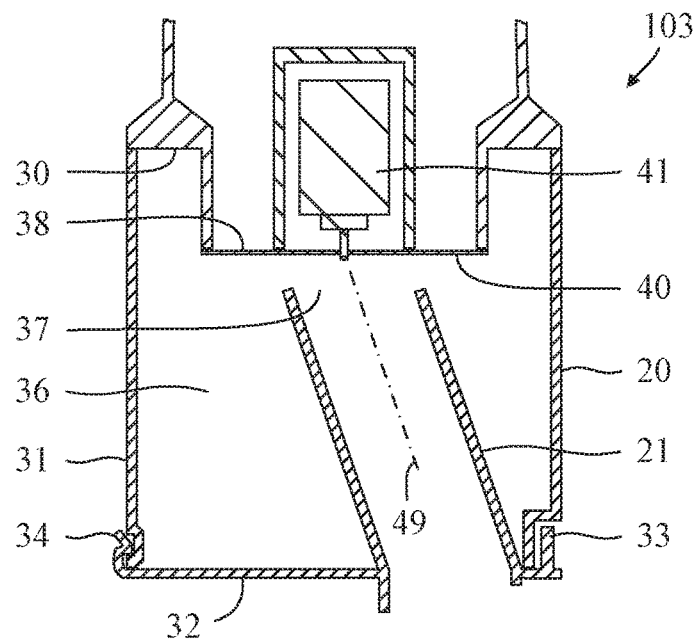
FIG. 11 is a section through a third alternative dirt separator.
Figure 12:
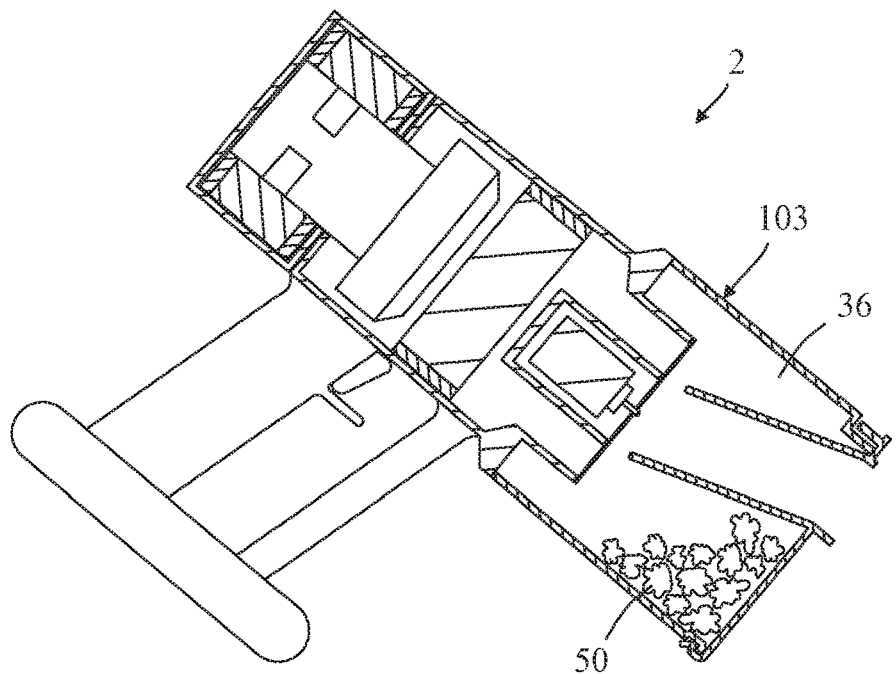
FIG. 12 is a section through a part of a vacuum cleaner having the third alternative dirt separator.
Figure 13:
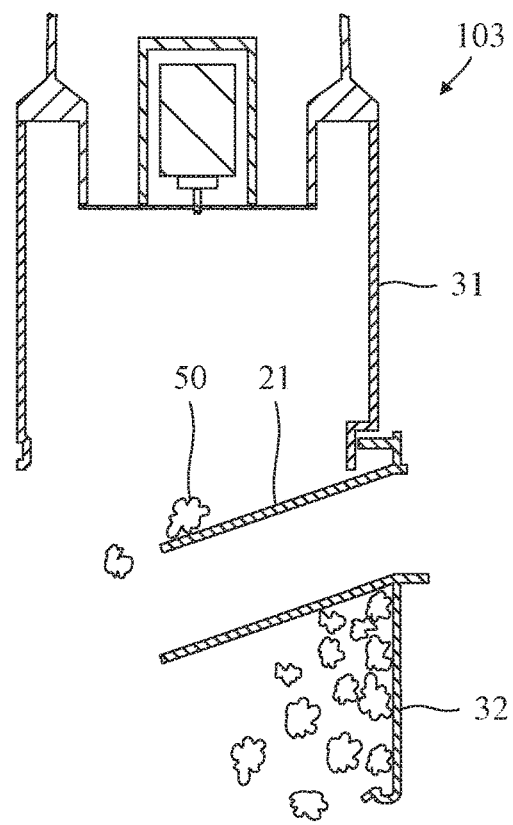
FIG. 13 illustrates emptying of the third alternative dirt separator.

In each of the dirt separators 10, 101, 102 described above, at least the end portion of the inlet duct 21 (i.e. that portion having the inlet 37) extends along an axis that is coincident with the rotational axis 48 of the disc 40. As a result, the dirt-laden fluid enters the chamber 36 in an axial direction that is directed at the centre of the disc 40. The advantages of this have been described above. However, there may instances for which it is desirable to have an alternative arrangement. For example, FIGS. 11-13 illustrate a dirt separator 103 in which the inlet duct 21 extends along an axis that is angled relative to the rotational axis 48 of the disc 40. That is to say that the inlet duct 21 extends along an axis that is non-parallel to the rotational axis 48. As a consequence of this arrangement, the dirt-laden fluid enters the chamber in a direction that is non-parallel to the rotational axis 48. Nevertheless, the dirt-laden fluid entering the chamber 36 continues to be directed at the disc 40. Indeed, with the dirt separator 103 shown in FIGS. 11-13, the dirt-laden fluid continues to be directed at the centre of the disc 40. This particular arrangement may be advantageous for a couple of reasons. First, when the vacuum cleaner 1 is used for floor cleaning, as shown in FIG. 1, the handheld unit 2 is generally directed downwards at an angle of about 45 degrees. As a result, dirt may collect unevenly within the dirt separator. In particular, dirt may collect preferentially along one side of the chamber 36. With the dirt separator 10 shown in FIG. 3, this uneven collection of dirt may mean that dirt fills to the top of the chamber 36 along one side, thus triggering a chamber-full condition, even though the opposite side of the chamber 36 may be relatively free of dirt. As illustrated in FIG. 12, the dirt separator 103 of FIGS. 11-13 may make better use of the available space. As a result, the capacity of the dirt separator 10 may be improved. The dirt separator 101 of FIG. 9 may also be said to have this advantage. However, the inlet duct 21 of the dirt separator 101 includes two bends. By contrast, the inlet duct 21 of the dirt separator 103 of FIGS. 11-13 is generally linear, and thus pressure losses are smaller. A further advantage of the arrangement shown in FIGS. 11-13 relates to emptying. As with the arrangement shown in FIG. 3, the inlet duct 21 is attached to and is moveable with the bottom wall 32. As shown in FIG. 6, when the dirt separator 10 of FIG. 3 is held vertically and the bottom wall 32 is in the open position, the inlet duct 21 extends horizontally. By contrast, as shown in FIG. 13, when the dirt separator 103 of FIGS. 11-13 is held vertically and the bottom wall 32 is opened, the inlet duct 21 is inclined downward. As a result, dirt is better encouraged to slide off the inlet duct 21.

Figure 14:
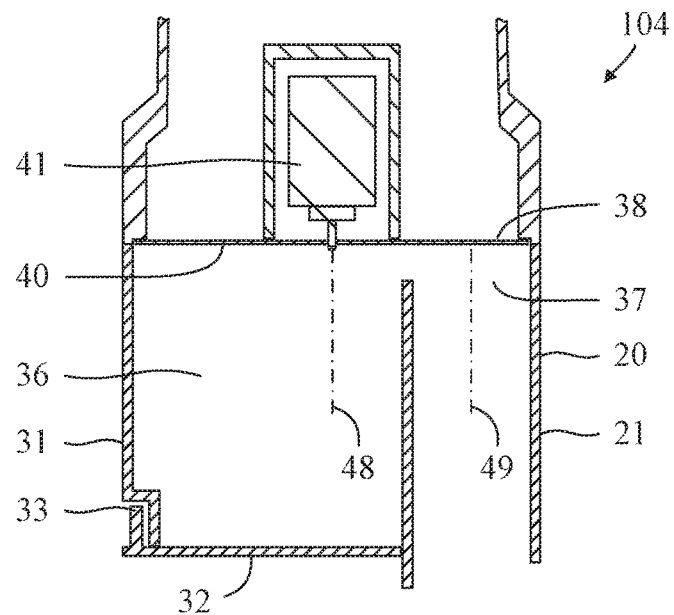
FIG. 14 is a section through a fourth alternative dirt separator.

In the arrangement shown in FIGS. 11-13, the dirt-laden fluid entering the chamber 36 continues to be directed at the centre of the disc 40. Although there are advantages in this arrangement, effective separation of dirt may nevertheless be achieved by directing the dirt-laden fluid off-centre. Moreover, there may be instances for which it is desirable to direct the dirt-laden fluid off-centre. For example, if the central region of the disc 40 were perforated, the dirt-laden fluid may be directed off-centre so as to avoid the region of the disc 40 where tangential speeds are slowest. As a result, a net gain in separation efficiency may be observed. By way of example, FIG. 14 illustrates an arrangement in which the dirt-laden fluid entering the chamber 36 is directed off-centre at the disc 40. Similar to the arrangement shown in FIG. 9, the inlet duct 21 is formed integrally with the side wall 31 of the container 20, and the bottom wall 32 is attached to the side wall 31 by a hinge 33 and catch (not shown). When the bottom wall 32 moves between the closed and opened positions, the position of the inlet duct 21 remains fixed. This then has the advantage that the container 20 is convenient to empty without the need to design a hinge and catch capable of withstanding the forces required to manoeuvre the cleaner head 4. Moreover, in contrast to the dirt separator 101 of FIG. 9, the inlet duct 21 is straight and thus pressure losses arising from the movement of the dirt-laden fluid through the inlet duct 21 are reduced.

In a more general sense, the dirt-laden fluid may be said to enter the chamber 36 along a flow axis 49. The flow axis 49 then intersects the disc 40 such that the dirt-laden fluid is directed at the disc 40. This then has the benefit that the dirt-laden fluid impacts the disc 40 shortly after entering the chamber 36. The disc 40 then imparts tangential forces to the dirt-laden fluid. The fluid is drawn through the holes 47 in the disc 40 whilst the dirt, owing to its greater inertia, moves radially outward and collects in the chamber 36. In the arrangements shown in FIGS. 3, 9, 10 and 11, the flow axis 49 intersects the centre of the disc 40, whilst in the arrangement shown in FIG. 14, the flow axis 49 intersects the disc 40 off-centre. Although there are advantages in having a flow axis 49 that intersects the centre of the disc 40, effective separation of dirt may nevertheless be achieved by having a flow axis 49 that intersects the disc 40 off-centre.

In each of the arrangements described above, the inlet duct 21 has a circular cross-section and thus the inlet 37 has a circular shape. Conceivably, the inlet duct 21 and the inlet 37 may have alternative shapes. Likewise, the shape of the disc 40 need not be circular. However, since the disc 40 rotates, it is not clear what advantages would be gained from having a non-circular disc. The perforated and non-perforated regions 45, 46 of the disc 40 may also have different shapes. In particular, the non-perforated region 45 need not be circular or located at the centre of the disc 40. For example, where the inlet duct 21 is directed off-centre at the disc 40, the non-perforated region 45 may take the form of an annulus. In the above discussions, reference is sometimes made to the diameter of a particular element. Where that element has a non-circular shape, the diameter corresponds to the maximal width of the element. For example, if the inlet 37 were rectangular or square in shape, the diameter of the inlet 37 would correspond to the diagonal of the inlet 37. Alternatively, if the inlet were elliptical in shape, the diameter of the inlet 37 would correspond to the width of the inlet 37 along the major axis.

The disc 40 is formed of a metal, such as stainless steel, which has at least two advantages over, say, a plastic. First, a relatively thin disc 40 having a relatively high stiffness may be achieved. Second, a relatively hard disc 40 may be achieved that is less susceptible to damage from hard or sharp objects that are carried by the fluid or fall onto the disc 40 when the handheld unit 2 is inverted, as shown in FIG. 7. Nevertheless, in spite of these advantages, the disc 40 could conceivably be formed of alternative materials, such as plastic. Indeed, the use of a plastic may have advantages over a metal. For example, by forming the disc 40 of a low-friction plastic, such as polyoxymethylene, the ring of low-friction material (e.g. PTFE) provided around the top wall 30 of the container 20 may be omitted.

Figure 15:
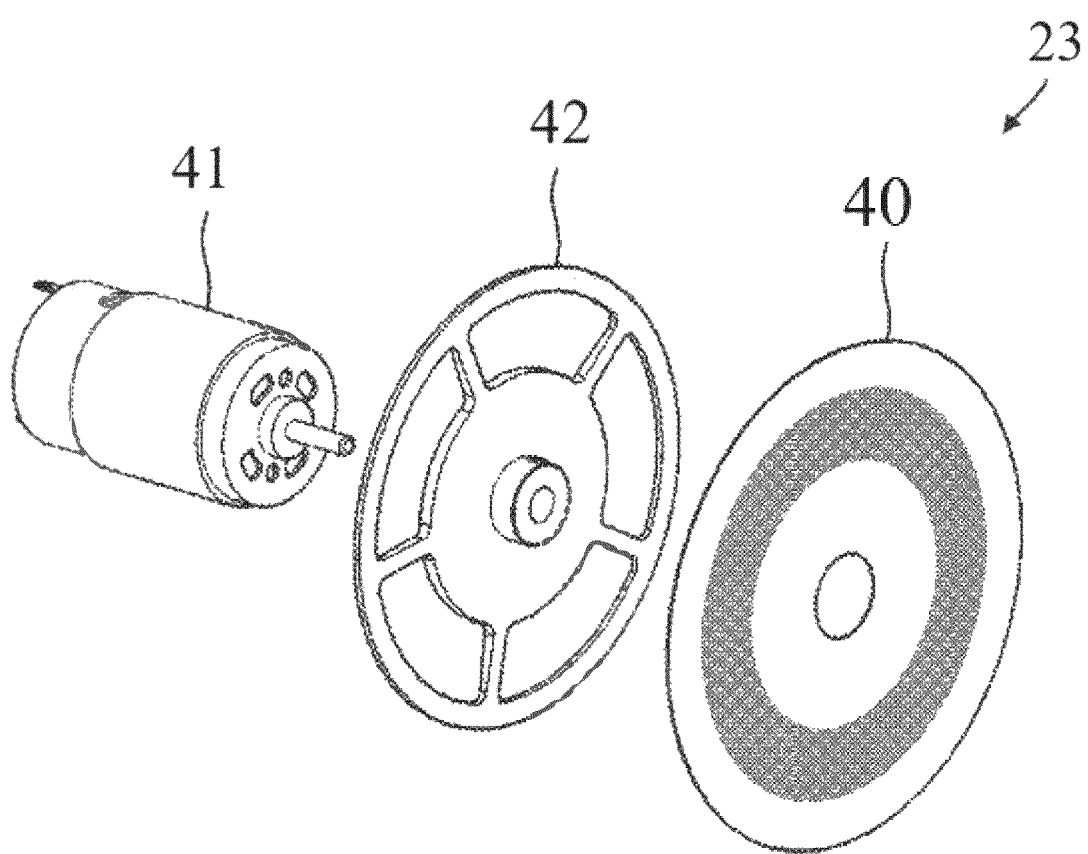
FIG. 15 illustrates an alternative disc assembly that may form part of any one of the dirt separators.

In the arrangements described above, the disc assembly 22 comprises a disc 40 directly attached to a shaft of an electric motor 41. Conceivably, the disc 40 may be attached indirectly to the electric motor, e.g. by means of a gearbox or drive dog. Furthermore, the disc assembly 22 may comprise a carrier to which the disc 40 is attached. By way of example, FIG. 15 illustrates a disc assembly 23 having a carrier 70. The carrier 70 may be used to increase the stiffness of the disc 40. As a result, a thinner disc 40 or a disc 40 having a larger diameter and/or a larger total open area may be used. The carrier 70 may also be used to form the seal between the disc assembly 23 and the container 20. In this regard, whilst a contact seal between the disc 40 and the top wall 30 has thus far been described, alternative types of seal may equally be employed, e.g. labyrinth seal or fluid seal. The carrier 70 may also be used to obstruct the central region of a wholly perforated disc. In the example shown in FIG. 15, the carrier 70 comprises a central hub 71, connected to a rim 72 by radial spokes 73. Fluid then moves through the carrier 70 via the apertures 74 between adjacent spokes 73.

Each of the disc assemblies 22, 23 described above comprises an electric motor 41 for driving the disc 40. Conceivably, the disc assembly 22, 23 may comprise alternative means for driving the disc 40. For example, the disc 40 may be driven by the vacuum motor 12. This arrangement is particularly viable with the layout shown in FIG. 1, in which the vacuum motor 12 rotates about an axis that is coincident with the rotational axis 48 of the disc 40. Alternatively, the disc assembly 22, 23 may comprise a turbine powered by the flow of fluid moving through the disc assembly 22, 23. A turbine is generally cheaper than an electric motor, but the speed of the turbine, and thus the speed of the disc 40, depends on the flow rate of fluid moving through the turbine. As a result, high separation efficiencies can be difficult to achieve at low flow rates. Additionally, if dirt were to clog any of the holes 47 in the disc 40, the open area of the disc 40 would decrease, thereby restricting the flow of fluid to the turbine. As a result, the speed of the disc 40 would decrease and thus the likelihood of clogging would increase. A runway effect then arises in which the disc 40 becomes increasingly slower as it clogs, and the disc 40 becomes increasingly clogged as it slows. Furthermore, if the suction opening in the cleaner head 4 were to become momentarily obstructed, the speed of the disc 40 would decrease significantly. Dirt may then build up significantly on the disc 40. When the obstruction is subsequently removed, the dirt may restrict the open area of the disc 40 to such an extent that the turbine is unable to drive the disc 40 at sufficient speed to throw off the dirt. An electric motor, whilst generally more expensive, has the advantage that the speed of the disc 40 is relatively insensitive to flow rates or fluid speeds. As a result, high separation efficiencies may be achieved at low flow rates and low fluid speeds. Additionally, the disc 40 is less likely to clog with dirt. A further advantage of using an electric motor is that it requires less electrical power. That is to say that, for a given flow rate and disc speed, the electrical power drawn by the electric motor 41 is less than the additional electrical power drawn by the vacuum motor 12 in order to drive the turbine.

The dirt separator 10 has thus far been described as forming part of a handheld unit 2 that may be used as a standalone cleaner or may be attached to a cleaner head 4 via an elongate tube 3 for use as a stick cleaner 1. The provision of a disc assembly in a handheld unit is by no means intuitive. Although the provision of a rotating disc within a dirt separator of a vacuum cleaner is known, there is an existing prejudice that the dirt separator must include a cyclone chamber to separate the dirt from the fluid. As a result, the overall size of the dirt separator is relatively large and is unsuitable for use in a handheld unit. With the dirt separator described herein, effective separation may be achieved in a relatively compact manner As a result, the dirt separator is particularly well suited for use in a handheld unit.

The weight of a handheld unit is clearly an important consideration in its design. The inclusion of an electric motor in addition to the vacuum motor is not therefore an obvious design choice. Additionally, where the handheld unit is battery powered, one might reasonably assume that the power consumed by the electric motor would shorten the runtime of the vacuum cleaner. However, by using an electric motor to drive the disc, relatively high separation efficiencies may be achieved for a relatively modest drop in pressure. Consequently, in comparison to a conventional handheld cleaner, the same cleaning performance may be achieved using a less powerful vacuum motor. A smaller vacuum motor may therefore be used that consumes less electrical power. As a result, a net reduction in weight and/or power consumption may be possible.

Although the dirt separator described herein is particularly well suited for use in a handheld vacuum cleaner, it will be appreciated that the dirt separator may equally be used in alternative types of vacuum cleaner, such as an upright, canister or robotic vacuum cleaner.

The invention claimed is:

1. A handheld vacuum cleaner comprising:
a dirt separator comprising:
a chamber having an inlet through which dirt-laden fluid enters the chamber and an outlet through which cleansed fluid exits the chamber;
an inlet duct extending through a wall of the chamber, the inlet defined by an end of the inlet duct; and
a disc located at the outlet, the disc being arranged to rotate about an axial center of the disc which is coaxial to a rotational axis and comprising holes through which the cleansed fluid passes,
wherein the inlet duct extends along a linear axis that is non-parallel to the rotational axis, and
wherein the linear axis of the inlet duct intersects the axial center of the disc and the linear axis is not coincidental to the rotational axis.

2. The vacuum cleaner of claim 1, wherein the dirt-laden fluid entering the chamber is directed at the disc.

3. The vacuum cleaner of claim 1, wherein the dirt-laden fluid entering the chamber is directed at a centre of the disc.

4. The vacuum cleaner of claim 1, wherein dirt separated from the dirt-laden fluid collects at a bottom of the chamber and fills progressively in a direction towards a top of the chamber, the outlet is located at or adjacent the top of the chamber, and the bottom of the chamber is spaced in a direction parallel to the rotational axis from the top of the chamber.

5. The vacuum cleaner of claim 1, wherein dirt separated from the dirt-laden fluid collects in the lower portion of the chamber located below the disc when the vacuum cleaner is used in a first orientation, and dirt collected in the lower portion moves to the upper portion of the chamber located above the disc when the vacuum cleaner is used in a second orientation.

6. The vacuum cleaner of claim 1, wherein the chamber surrounds the inlet duct.

7. The vacuum cleaner of claim 1, wherein an opposite end of the inlet duct is attachable to different attachments of the vacuum cleaner.

8. The vacuum cleaner of claim 1, wherein a wall of the chamber is moveable between an open position and a closed position, and the inlet duct is attached to and moveable with the wall.

* * * * *